United States Patent [19]

Murphy

[11] 3,978,656

[45] Sept. 7, 1976

[54] GAS TURBINE ENGINE AIR INLETS HAVING PARTICLE SEPARATORS

[75] Inventor: Joseph P. Murphy, Newtown, Conn.

[73] Assignee: Avco Corporation, Stratford, Conn.

[22] Filed: Feb. 20, 1975

[21] Appl. No.: 551,088

[52] U.S. Cl. .................. 60/39.09 P; 60/39.09 D; 55/306
[51] Int. Cl.² .................. F02C 7/09; F02C 7/00
[58] Field of Search ............. 60/39.09 D, 39.09 P; 55/306; 137/15.1, 15.2; 415/121 G

[56] References Cited
UNITED STATES PATENTS

| 3,123,283 | 3/1964 | Leis | 60/39.09 D |
| 3,673,771 | 7/1972 | Dickey | 55/306 |
| 3,720,045 | 3/1973 | Murphy | 60/39.09 P |
| 3,778,983 | 12/1973 | Rygg | 60/39.09 P |

Primary Examiner—Carlton R. Croyle
Assistant Examiner—L. J. Casaregola
Attorney, Agent, or Firm—Charles M. Hogan; Irwin P. Garfinkle; Edmunds S. Lee

[57] ABSTRACT

A gas turbine engine air inlet having an improved separator for particulate matter is described. Liner means define an annular flow passage which curves inwardly to the entrance of the engine's compressor. Hollow struts extend radially through the curved portion of the air passage. A V-shaped trap provides particle receiving pocket portions which span adjacent struts and open into first chambers in the struts. A plate extends downstream of the upstream edge of the inner trap leg to define a narrow entrance to the pocket portions. The upstream edge of the inner trap leg is spaced inwardly of the inner liner means at the entrance portion to capture most, if not all, of the particulate matter entrained in the inner portion of the air stream. The outer liner means comprise first and second liners, with the latter having its upstream edge radially inward of the upstream edge of the outer trap leg and intermediate its length. Plates extending from the first and second outer liners define the entrance to pocket portions, outwardly of the second outer liner, which capture particulate matter from the outer portions of the air flow stream. These outer pocket portions also open into the first strut chambers which are maintained at a reduced pressure to draw particulate matter therein for disposal. The second strut chambers are connected to the compressor discharge to provide warm air which flows through passages in the separator to inhibit ice formation.

12 Claims, 6 Drawing Figures

GAS TURBINE ENGINE AIR INLETS HAVING PARTICLE SEPARATORS

The present invention relates to improvements in particle separators for the air inlets of gas turbine engines.

Gas turbine engines are particularly vulnerable to erosion from particulate matter which becomes entrained in the air flow therethrough. Helicopters, particularly when operating at low levels or from unimproved landing areas, exemplify an engine application where significant amounts of sand and dirt may be ingested. Due to the high mass flow rates of the air required in operation of gas turbine engines, turbine and compressor blades and vanes can be quickly worn by the high velocity particles. Sand particles, for example, are quite abrasive and will rapidly erode compressor blades, in particular, to the point that their aerodynamic effectiveness is lost and engine power drastically reduced.

While it is possible to remove all particulate matter, down to extremely small micron size, from the engine air flow by filtration, such an approach involves undue bulk or pressure loss or both. As a result, separators have been devised which divert and/or collect the particulate matter from the air flow prior to its entrance into the compressor of the engine. Generally speaking, as compared to filters, separators sacrifice efficiency in separation for reduced pressure loss and reduced weight and bulk. Thus, such separators prevent a substantial portion of the entrained particular matter in the air from entering the engine, particularly the larger particle sizes. While separators have been added externally of the engine inlets which are normally provided to minimize flow perturbations in the air entering the compressor, it has been found preferable to build such separators directly into the air inlets. Examples of the latter type of separators, are found in U.S. Pat. Nos. 3,673,771 issued to E. A. Dickey and 3,778,983 issued to G. G. Rygg, both of common assignment with the present application.

Separators of the type referenced have been found effective and widely employed on gas turbine engines operating in hostile environments. Nontheless, prior art separators have failed to fully meet the desired levels of operation efficiency without undue pressure loss. Further these prior separators, generally speaking, lack rigidity which renders them prone to induced vibration and distortion, as well as subject to damage from larger foreign objects entrained in the air stream. The latter function of blocking foreign objects, such as birds and rocks, to prevent engine component damage therefrom is another advantage of separators, provided of course the foreign object does not tear the separator loose so it is ingested in the engine causing even greater damage that the foreign object would have caused.

A further problem encountered in the use of separators is that, being disposed in the inlet air stream, additional surfaces are available on which ice may form. While ice formation is undesirable in any engine inlet the added surface area of the separator elements makes the problem of even greater seriousness particularly in aircraft applications.

Accordingly, a principle object of the present invention is to provide an improved separator for removing entrained particulate matter from the air flow stream to a gas turbine engine inlet and more particularly to provide such a separator having improved separation efficiency with a minimum of pressure loss in the air flow stream.

Another object of the invention is to attain the above ends and further to provide a separator of rugged and economical construction.

Another object of the invention is to attain the above ends and further to minimize if not prevent the formation of ice on the separator surfaces.

A further object of the present invention is to provide improved anti-icing means for separators which capture entrained particulate from the inlet air flow.

In accordance with its broader aspects the invention may be embodied in a gas turbine engine air inlet comprising inner and outer liner means which define an annular air passage which curves from an entrance portion inwardly, relative to the engine axis, to the engine compressor entrance.

A plurality of hollow struts extend radially through the curved portion of the air flow passage. A first trap of generally V-shaped cross section is disposed in and generally aligned with the direction of air flow in the curved portion of the passage. The apex of this V-shaped trap is pointed in a downstream direction with the legs of the trap being concentric of engine axis. The apex end portions of the trap form particle receiving pocket portions which span adjacent struts and open into the interiors thereof. A plate extends from the upstream edge of the inner leg of the trap towards the inner surface of the outer leg thereof. This plate is disposed at a low angle relative to air flow direction and terminates in closely spaced relation to said outer leg to define a narrow entrance to the particle receiving pocket portions. The upstream edge of the inner leg is disposed radially inwardly of the inner liner means, at the entrance portion thereof, whereby the V-shaped trap captures particulate matter from the inner portion of the air stream.

The interiors of the struts are maintained at a reduced pressure to draw particulate matter from the pocket portions for its ultimate disposal. Other means are then provided for capturing particulate matter from the outer portion of the air flow stream.

Preferably the leading edge portion of the outer trap leg is generally aligned with the direction of air flow therepast and is spaced upstream of the struts which extend through the curved portion of the flow passage. The leading edge of the inner trap is then disposed downstream of the leading edge of the struts.

The outer liner means preferably comprise a first outer liner defining the outer bounds of air flow through the entrance portion of the air passageway and extending downstream of the V-shaped trap outwardly thereof. A second outer liner then has its upstream edge spaced radially inwardly of the leading edge of the outer trap leg and intermediate the length thereof. The second outer liner defines the outer bounds of the air flow passage downstream of its leading edge.

Preferably, the liner means define a passage of substantially constant meridional velocity and the flow area between the inner liner means and the inner trap leg is substantially constant. Likewise, it is preferable that the flow area between the coextensive lengths of the second outer liner and the outer trap leg be substantially constant. Additionally, it is preferable that these respective flow areas be equal and that their combined flow areas approximate the flow area through the entrance portion of the air passage.

The trap means for capturing particulate matter from the outer portion of the air flow stream may comprise particle receiving pockets, outwardly of the second liner, which span adjacent struts and open into the interiors thereof. A plate angled inwardly from the first outer liner and another plate extending downstream from the leading edge of the second outer liner may combine to form a relatively narrow entrance to the outer pocket portions.

The interiors of the hollow struts may be divided into first and second chambers. The first chambers of the struts are connected to the means for maintaining a reduced pressure and the pocket receiving portions open into the first chambers. Particulate matter is thus drawn into these strut chambers.

The second chambers may be connected to a source of pressurized relatively warm gas, such as compressor discharge air. The outer and inner trap legs have passages which extend along at least the leading edge portions thereof and open into the second chambers of the struts. Ports are then provided in the trap leg passages for directing the hot gas into the air flow stream thereover. The outer trap leg chamber may be extended substantially co-extensive with the length of the pocket entrance defining plate thereof and port means provided for directing hot gas toward the trailing edge of said plate. The pocket entrance defining plate extending downstream from the leading edge of the second outer liner may also have a passage formed therein which opens into the second chambers of the struts and ports may be provided for directing hot gas therefrom into the air flow thereover. Hot gas flow through these passages inhibits ice formation on the separator surfaces.

In accordance with other and broader aspects, the invention may comprise the use of such double chambered struts spanned by separating means having pocket portions for capturing particulate material from the inlet air flow stream and hot gas passage therein. The pocket portions open into the first strut chambers for disposal of particulate matter captured therein. The hot gas passages open into the second strut chambers to provide for hot gas flow which inhibits ice formation.

The above and other related objects and features of the invention will be apparent from a reading of the following description of the disclosure, with reference to the accompanying drawings, and the novelty thereof pointed out in the appended claims.

Figure 1:
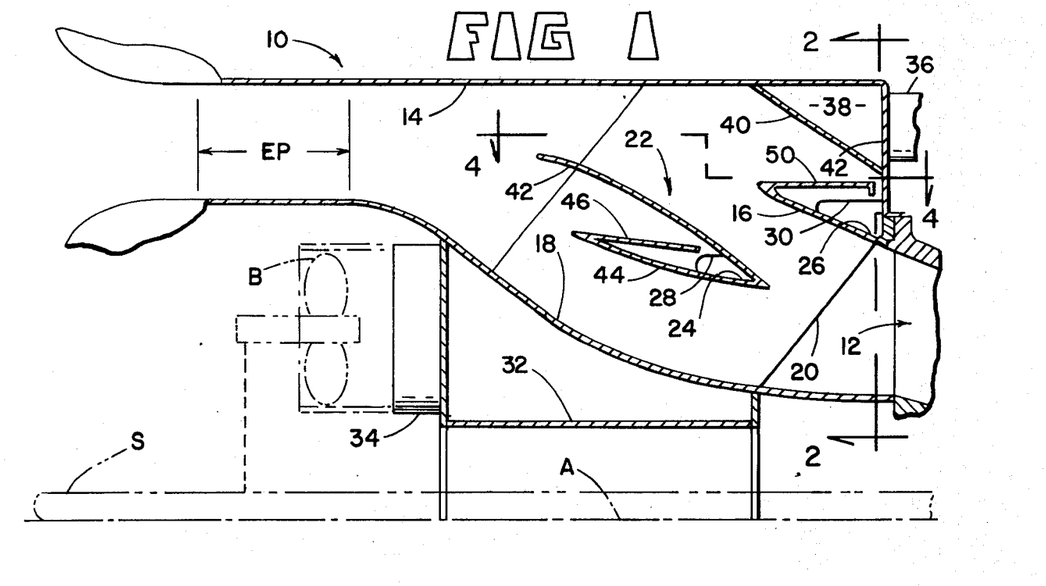
FIG. 1 is a longitudinal half-section of a gas turbine engine air inlet incorporating a particle separator embodying the present invention.
Figure 2:
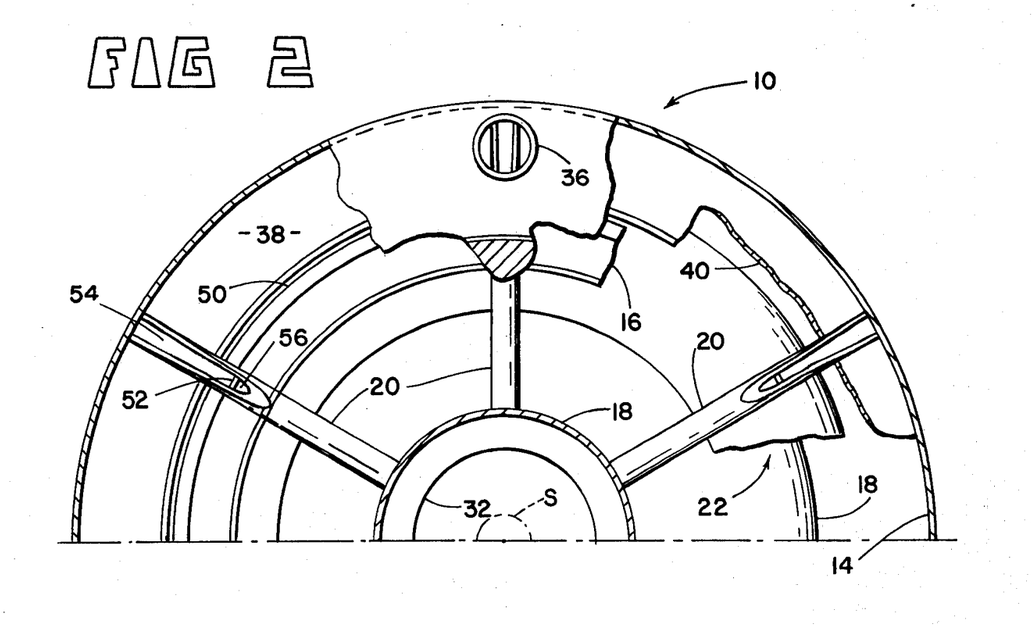
FIG. 2 is a section taken generally on line 2—2 in FIG. 1.

FIGS. 1 and 2 show an air inlet 10 for a gas turbine engine of the type normally comprising a compressor for pressurizing an air stream, a combustor in which the pressurized air supports combustion of fuel in the generation of a hot gas stream, and a turbine driven by the hot gas stream and coupled to the compressor to provide the energy for pressurizing the air. The greater portion of the hot gas stream energy is converted to a useful output as by driving a power turbine which provides motive shaft power. A common application of such shaft engines is in powering the rotor of a helicopter. In FIG. 1 the only portions of the engine which are illustrated are the entrance to the compressor indicated at 12 and a forwardly extending output shaft S, indicated by broken lines. The inlet 10 serves the primary function of guiding air to the compressor entrance 12 in a fashion that minimizes perturbations which might effect engine performance and is modified in accordance with a present invention to separate particulate matter from the air prior to its reaching the compressor entrance 12.

The inlet 10 comprises a first outer liner 14 and a second outer liner 16 which in combination with an inner liner 18 define an annular flow passage. This flow passage includes an entrance portion EP of substantially constant flow area through which the air flows in an axial direction (note, herein, the terms radial and axial are in refeence to the axis of the engine indicated by the broken line A). From the entrance portion EP the flow passageway curves rapidly inwardly to enter the compressor entrance in an essentially axial direction.

A plurality of hollow, air foil shaped struts 20 are angularly spaced and extend from the inner liner 18 through the curved portion of the flow passage. A V-shaped trap 22 captures particulate matter such as sand and dirt from the inner portion of the air flow stream and directs it into particle receiving pocket portions 24. The particulate matter in the outer portion of the air stream is captured and directed into particle receiving pocket portions 26. The pocket portions 24 and 25 are concentric of the engine axis A and span adjacent struts 20. The construction of the separator for capturing particles from the air stream will later be described in greater detail. However, it will be briefly noted that the pocket portions 24 and 26 communicate with the interiors of the struts 20 by way of openings 28 and 30 respectively formed in the side walls of struts.

The interiors of the struts in turn open into a manifold 32 interiorly of the inner liner 18. The manifold 32 is provided with an outlet duct 34 which is aerodynamically coupled to a blower B. The latter is mechanically coupled to and rotated by the shaft S. Thus, a reduced pressure is maintained in manifold 32 and the interiors of the struts 20 to draw particulate matter from the pocket portions 24 and 26. This particulate matter is then eventually discharged through the duct 34 and may then be disposed overboard of the engine or otherwise as desired.

A brief reference will also be made to the anti-icing means provided by the present invention which are shown only in part in FIGS. 1 and 2. A duct 36 is connected to the compressor discharge passageway of the engine or other source of pressurized heated gas or air. This heated air is introduced by way of the duct 36 into an annular manifold 38 defined by the outer liner 14, an angled plate 40 and an end wall 42. Chambers within the struts 20 open into the manifold 38. Heated air is then directed from the struts to selected portions of the separator to inhibit the formation of ice thereon as will be later described in greater detail.

References next had to FIGS. 3–6 which show the V-shaped trap 22 in greater detail. This trap is formed concentrically of the engine axis and comprises an outer leg 42 and an inner leg 44 which join at the apex of the V to point in a downstream direction. An annular plate 46, also concentric of the engine axis, extends from the upstream edge of the inner leg 44 toward the outer leg 42 and in closely spaced relation therefrom to define a relatively narrow entrance to the particle receiving pocket portions 24. The trap legs 42, 44, which are herein referred to in the singular, form the pocket portions 24 at their apex end portions.

Figure 3:
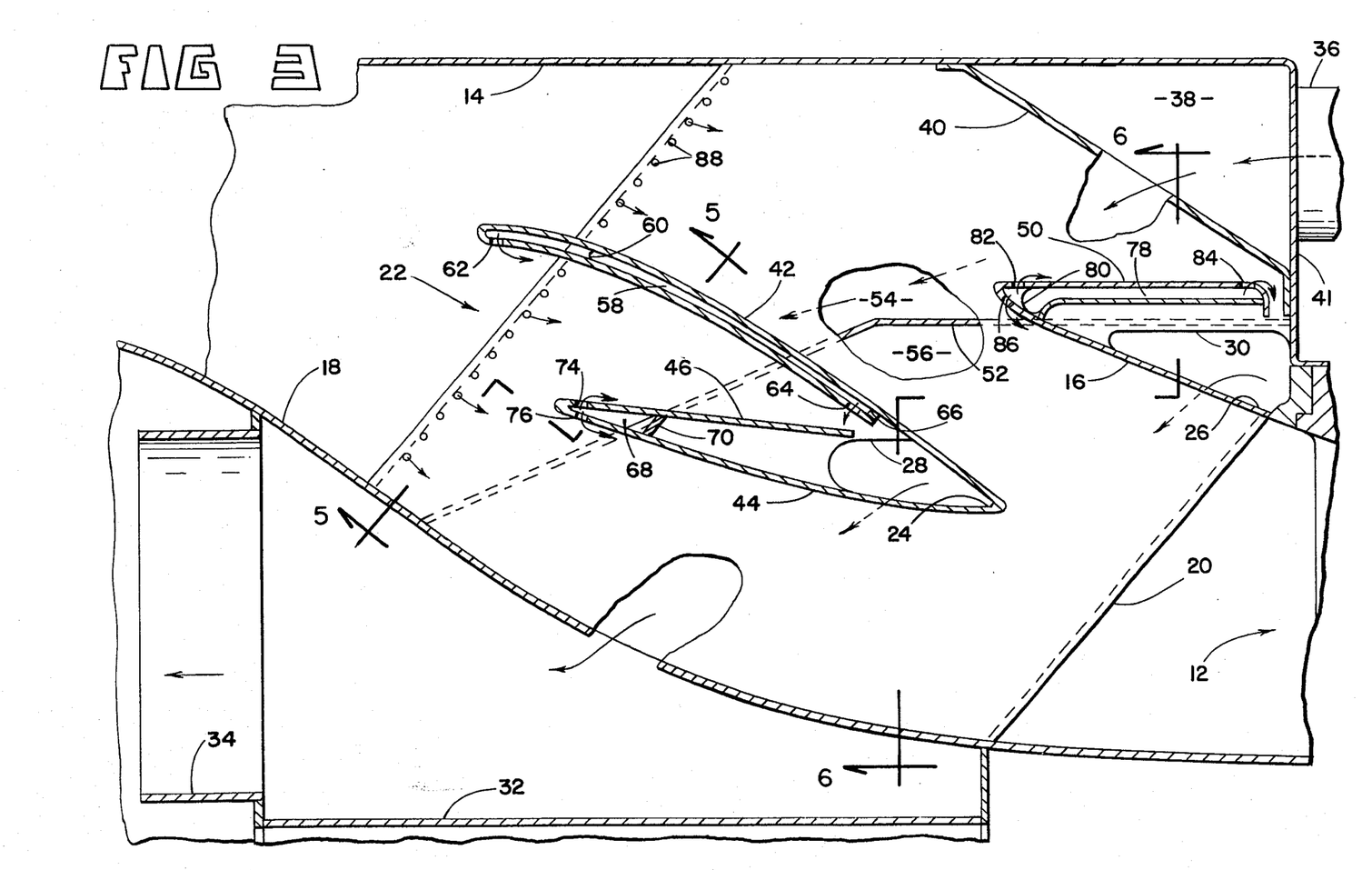
FIG. 3 is an enlarged portion of FIG. 1 showing the separator of the present invention in greater detail.
Figure 4:
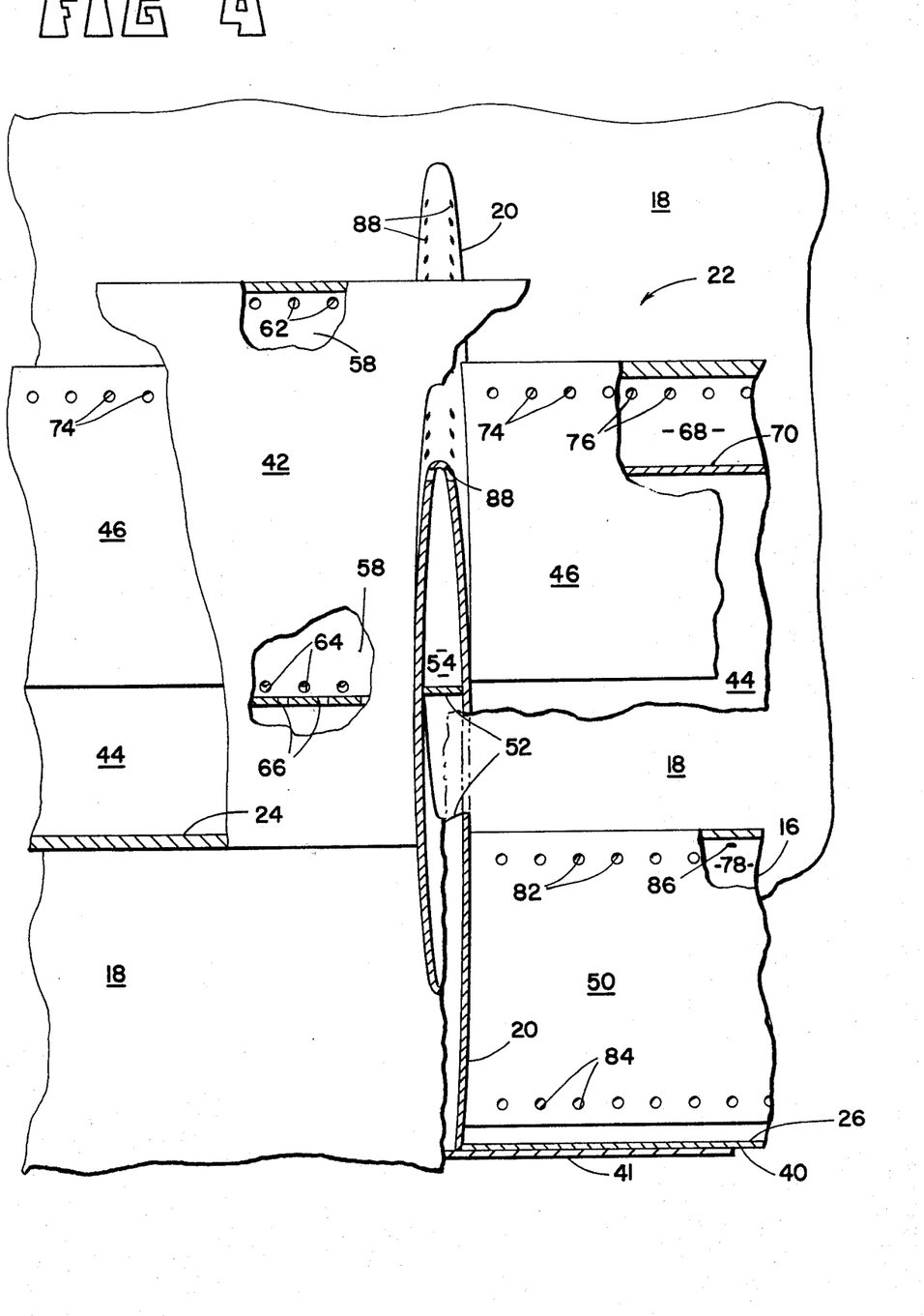
FIG. 4 is a radial projection taken generally on line 4—4 in FIG. 1.
Figure 5:
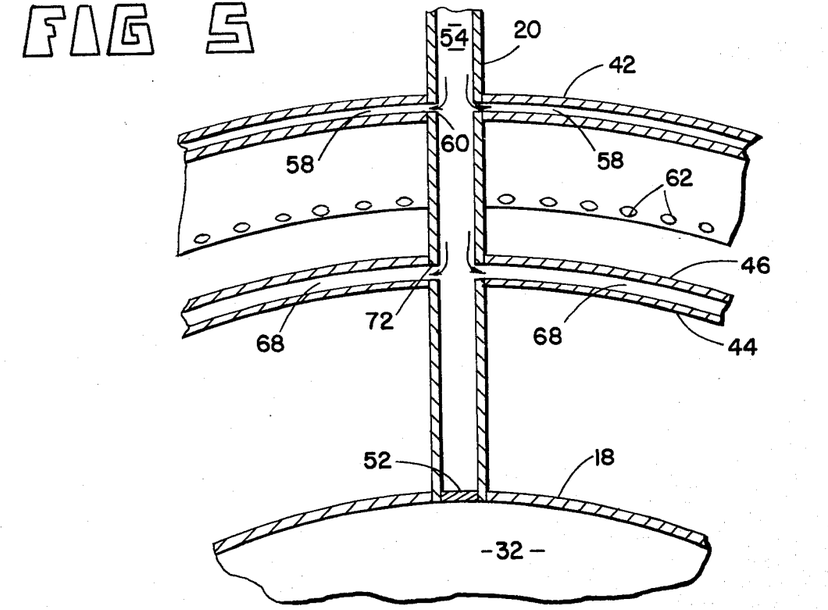
FIG. 5 is a section through a strut taken generally along line 5—5 of FIG. 3.

The upstream edge of the outer trap leg 42 is spaced upstream of the struts 20 and has a slightly negative angle relative to the air flow direction at this point, in order to minimize deflection of particles beyond the trap 22 as the air stream is split thereby. The upstream edge of the inner leg 40 is spaced radially inwardly and downstream of the leading edge of the outer leg 42. The marginal edge surface portion of the inner leg 42 is generally tangent of the direction of air flow at that point. The plate 46 is disposed at a relatively low angle with respect to the direction of air flow. The relative spacing of the leading edges of the legs 42 and 44 and the pressure which builds up at the pocket entrance, aerodynamically forms a surface which facilitates the turning of the air radially inwardly with a minimum of turbulence and pressure loss.

As the inner portion of the air stream is so turned, particulate matter entrained therein will be captured between the trap legs 42 and 44 and funneled into the pocket 24 with a minimum possibility of rebounding into the air flow to the engine. More specifically, it will be noted that the upstream edge of the inner trap leg 42, in addition to being spaced radially inwardly of the outer trap leg is also spaced inwardly of the inner liner 18 at the entrance portion EP. Particulate matter flowing through the entrance portion EP has imparted to it a substantial inertia in an axial direction with little or no inward radial component. As the air turns radially inward, preferably with a constant meridional velocity, there will be a minimum tendency for the air to exert a drag force on the particulate matter. There will, however, be some radial drag which will affect the direction of travel of smaller particles, particularly as they approach the small micron size range. The downstream and radially inward spacing of the trap entrance at the upstream edge of the trap leg 44 minimizes the possibility of particles flowing past that point. Any particles which remain entrained in the air will generally be of small micron size and of minimal significance in causing erosion of the engine components.

Particulate matter is captured from the outer portion of the air stream in a similar fashion. The inner surface of the manifold defining an angled plate 40 forms one portion of a V-shaped narrow entrance to the outer pocket receiving portions 26. The other entrance surface is provided by a plate 50 which extends downstream from the leading edge of the second outer liner 16.

The leading edge of the second outer liner 16 in combination with the outer liner 14 forms an aerodynamic turning surface taking into account the pressure build-up at the entrance to the outer trap 26 as defined by the plates 40 and 50. Thus, the outer portion of the air stream is turned radially inward, again with a substantially constant meridional velocity, generally following the curvature of the outer surface of the trap leg 42.

The particulate matter entrained in the outer portions of the air stream also has a substantial inertia imparted to it in an axial direction as it passes through the entrance portion EP. As the air flow direction is turned, there is a minimal tendency of the air dragging the particulate matter radially inwardly. The particles will continue in a generally axial direction to be captured between the entry surfaces 40 and 50 and pass through the relatively narrow entrance defined thereby to enter the outer pocket receiving portions 26. The outer plane 40 has a relatively low angle of incidence with respect to the direction of air flow or particle angle of impingement so that there is a minimal possibility of particles rebounding into the air passing into the engine. The angle of incidence on the plate 50 is similarly low so that there is a maximum assurance that particles captured between the plates 40 and 50 will be directed into the pocket portions 26. To this end it will also be noted that the leading edge of the plate 50 is spaced radially inwardly of the leading edge of the outer trap leg 42. Thus, most particles that have had any radial drag imparted to them by the air will nonetheless be captured and, generally, only particles of extremely small micron size will pass beyond the separator and into the engine.

It was previously noted that it is preferred to maintain a constant meridional velocity as the air turned radially inwardly and the particulate matter is captured in the pocket portions 24 and 26. Further and consistent with these ends it is preferred that the flow area between the inner liner 18 and the inner trap leg 44 be maintained constant. Likewise, it is preferred that the flow area between the co-extensive portions of the outer trap leg 42 and the second outer liner 16 be maintained essentially constant. Further, it is preferred that the combined flow areas between the inner linenr and the inner trap leg and between the outer trap leg and the second outer liner equal or approximate the flow area through the entrance portion EP and also that the flow areas on opposite sides of the trap be equal to each other. These velocity considerations and flow areas as well as the relationship of various flow guiding surfaces to the direction of air flow minimize energy loses as well as contributing to separation efficiency.

Figure 6:
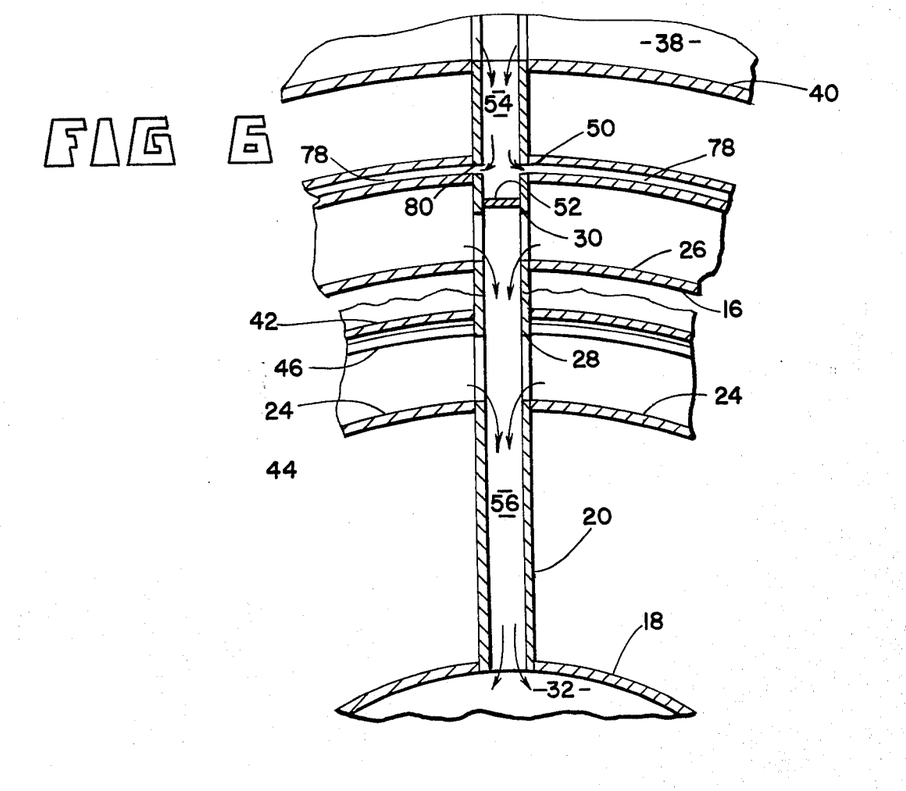
FIG. 6 is a section taken generally on line 6—6 in FIG. 3.

From FIGS. 3 and 6 it will be seen that a wall 52 divides the interior of each strut 20 into separate chambers 54 and 56. The strut will openings 28 and 30 respectively place the particle receiving pocket portions 24 and 26 in communication with the strut chambers 56 which in turn open into the manifold 32, but are otherwise sealed. The particles captured into the pocket portions 24 and 26 are thus drawn into the strut chambers 56 and then into the manifold 32 from where they may be discharged through the duct 34.

The anti-icing means of the present invention which uniquely cooperate with the separator functions will now be described.

Hot air, introduced into the manifold 38, as previously described, flows into the strut chambers 54 and then is distributed to selected portions of the separator where prevention of ice formation is of greatest importance. Except for this selected flow of heated air from the chambers 54 they are otherwise sealed so that there is no direct communication with the reduced pressure chambers 56 or the manifold 32.

The outer trap leg 42 is of double walled construction from its leading edge to a point downstream of the trailing edge of the entrance forming plate 46. Thus a hot air passage 58 is formed which communicates with the strut chambers 54 through openings 60 formed in the strut walls. A series of angularly spaced ports 62 are formed adjacent the leading edge of the trap leg 42 and direct heated air inwardly along its inner surface. Another series of ports 64 are formed adjacently to the downstream end of the double walled portion of the trap leg and direct heated air from the passage 58 toward the trailing edge of the plate 46. A further series of ports 66 direct heated air towards the apex of the pocket 24.

A hot air passage 68 is also provided along the leading edge of the plates 46 and the leg 44, being defined by these components and by a wall 70 extending therebetween. The passage 68 communicates with the hot air chambers 54 through openings 72 formed in the walls of the struts. A series of ports 74 and a series of ports 76, respectively formed in the plate 46 and the trap leg 44 adjacent their common leading edge, direct heated air from the passage 68 into the air flow streams therepast. The combined effect of hot air flow through the passageways 58 and 68 and the discharge of air from the several series of ports into the air flow streams therepast effectively heats all essential surfaces of the V-shaped trap 22 as well as the pocket portions 24. Thus, ice formation on these surfaces is at least inhibited if not prevented. Further, freezing together of the trapped particles in the pocket portions 24, which could be an even more serious hazard, is likewise inhibited, if not fully prevented.

The separator means for the outer portions of the air stream are similarly provided with anti-icing means. The outer trap entrance wall 40, defining in part the hot air manifold 38, is sufficiently heated by the air flow through the manifold to prevent ice formation thereon. The other plate 50 defining the entrance to the outer pocket portions 26 is also of double walled construction to define a hot gas passageway 78 extending from its leading edge where it connects with the second outer liner 16 to its downstream end. The passage 78 communicates with the hot air chambers 54 through openings 80 in the strut walls. A series of ports 82 and a series of ports 84 are formed in the plate 50 adjacent its leading and trailing edges respectively, to discharge hot air from the passageway 78. Ports 86 are also formed in the second outer liner 16 adjacent its leading edge. Air flow past the several series of ports spreads the hot air discharged therefrom over their respective outer surface. This, combined with the hot air flow through the passage 78, heats these surfaces to inhibit if not prevent the formation of ice thereon. Further the hot air discharged from the ports 82 and 84 is carried into the pocket 26 to likewise inhibit if not prevent the formation of ice in the pocket portions or icing of the particles captured therein.

Hot air may also be discharged from a series of ports 88 formed in the walls of the struts 20 adjacent their leading edges. These ports also communicate with the chambers 54 and hot air discharged from the ports 88 is distributed by the air flow therepast. Effective heating is thereby provided at the leading edge portions of the struts which is the most critical area insofar as the likelihood of ice formations is concerned.

The described V-shaped trap minimizes the number of separator elements disposed in the primary air flow stream through the engine inlet thus enabling the use of relatively large components which may be of rugged construction and resistant to vibration. The described anti-icing means uniquely combines with this type of trap construction as well as with the overall separator construction to provide through the double walled construction for hot air flow passages, a more rigid yet light weight construction.

Various features referenced herein are not necessarily to be taken as limitations to the broader aspects of the invention. Wherefore, the spirit and scope of the invention is to be derived from the following claims.

Having thus described the invention what is claimed as novel and desired to be secured by Letters Patent of the United States is:

1. A gas turbine engine air inlet comprising:
    inner and outer liner means defining an annular air passage which curves inward relative to the engine axis from an entrance portion toward the engine compressor entrance;
    a plurality of hollow struts extending radially through the curved portion of the air flow passage;
    means for capturing particulate matter from the inner portion of said annular passage, said means including a first trap of generally V-shaped cross section having inner and outer legs, the downstream end of each of said legs being joined to form an apex, said first trap being disposed in and generally aligned with the direction of air flow in the curved portion of the passage, said inner and outer legs of said first trap being concentric with the engine axis, said legs forming at the apex end portion thereof particle receiving pocket portions spanning adjacent struts, said pocket portions opening into the interiors of said struts, the upstream end of said inner leg being joined by an annular plate extending therefrom towards the inner surface of said outer leg, said plate being disposed at a low angle relative to the air flow direction and terminating in spaced relation to said outer leg to define a narrow entrance to the particle receiving pocket portions;
    means for capturing particulate matter from the outer portion of the air flow streams, said means including a first outer liner defining the outer bounds of air flow through the entrance portion of the air passage and extending downstream of said first trap of generally V-shaped cross section and outwardly thereof, a second outer liner having its upstream edge spaced to be radially inward of the leading edge of the outer leg of said first trap and intermediate the length thereof, said second outer liner defining the outer bounds of the air passage downstream of its leading edge, and including particle receiving pocket portions, outwardly of the second outer liner, which span adjacent struts and open into the interiors thereof, a plate angled inwardly from the first outer liner towards the outer pocket portions, and a plate extending downstream from the leading edge of the second outer liner and terminating in closely spaced relation from said angled plate to define a relatively narrow entrance to the outer pocket portions,
    the outer pocket portions and the plates defining the entrance thereto being concentric of the engine axis; and
    means for maintaining a reduced pressure within the interior of said struts to draw particles thereinto from both of said particle collecting pocket portions.

2. A gas turbine engine air inlet as in claim 1 wherein the flow areas between the inner liner means and the inner trap leg and between the coextensive lengths of the outer trap leg and the second outer liner are equal and these combined flow areas approximate the flow area through the entrance portion of the air passage.

3. A gas turbine engine air inlet as in claim 1 wherein the interiors of said struts are divided into first and second chambers, said particle receiving pocket portions open into said first chambers and the latter are in communication with the means for maintaining a reduced pressure, means are provided for introducing pressurized hot gas into said second chamber, the outer trap leg has hot gas passages in communication with said second strut chambers, the inner trap leg has hot gas passages extending along its leading edge portion, which passages are also in communication with said second strut chambers, and ports are provided for directing heated air from said hot gas passages into the air flow stream.

4. A gas turbine air inlet as in claim 3 wherein further ports are provided for directing heated air from the hot gas passages of the outer trap leg towards the trailing edge of the plate defining the entrance to said pocket portions and also toward the apex end of the pocket portions.

5. A gas turbine engine air inlet as in claim 4 wherein the outer trap leg is of spaced, double wall construction from its leading edge to adjacent the plate defining the pocket portion entrance, thereby forming the hot gas passage therein.

6. A gas turbine engine air inlet as in claim 3 wherein the outer liner means comprise a first outer liner defining the outer bounds of air flow through the entrance portion of the air passage and extending downstream of said V-shaped trap outwardly thereof and a second outer liner having its upstream edge spaced radially inwardly of the leading edge of the outer trap leg intermediate the length thereof, said second outer liner defining the outer bounds of the air passage downstream of its leading edge, and further wherein the trap means for capturing particulate matter from the outer portion of the air flow stream comprise particle receiving pocket portions, outwardly of the second outer liner, which span adjacent struts and open into said first strut chambers, a plate angled inwardly from the first outer liner towards the outer pocket portions, and a plate extending downstream from the leading edge of the second outer liner and terminating in closely spaced relation from said angled plate to define a relatively narrow entrance to the outer pocket portions, the outer pocket portions and the plates defining the entrance thereto being concentric of the engine axis, and further wherein hot gas flow passages are formed in the plate extending downstream from the leading edge of the second outer liner, said hot gas flow passages opening into said second strut chambers, and ports are provided for directing hot gas from the last named hot gas flow passages into the air flow stream.

7. A gas turbine engine air inlet as in claim 6 wherein the plate extending downstream of the leading edge of the second outer liner is of spaced double walled construction from the second outer liner to its downstream edge thereby forming the hot gas passages therein, and said ports comprise a series of ports in said plate and said second outer liner marginally of their joined upstream edges and a further series of ports at the downstream edge of said plate.

8. A gas turbine engine air inlet as in claim 6 wherein the means for introducing pressurized hot gas into said second strut chambers comprise an annular manifold surrounding the outer ends of said struts, being defined in part by said angled plate, said annular manifold being connected to a source of pressurized hot gas, and said second strut chambers opening into said manifold.

9. A gas turbine engine air inlet as in claim 8 wherein the means for maintaining a reduced pressure in the first strut chambers comprise a manifold inwardly of and defined in part by said inner liner means, said first strut chambers opening into said inner manifold, and said inner manifold having an outlet duct aerodynamically connected to pressure reducing means.

10. A gas turbine engine air inlet comprising inner and outer inner means defining an annular air flow passage, a plurality of hollow struts extending radially between said liner means through said flow passage, means spanning said struts for separating entrained particulate matter from the air flowing through said passageway, said separating means having at least one hot gas flow passage therein and pocket portions in which separated particulate matter is captured, each of such struts having first and second chambers, respectively in communication with said pocket portions and said hot gas flow passage, means for introducing pressurized hot gas into said second strut chambers to thereby inhibit the formation of ice on the separating means, and means for maintaining a reduced pressure in said first strut chambers to draw particulate matter from said pocket portions into said struts.

11. A gas turbine air inlet as in claim 10 wherein the means for introducing hot gas into the second strut chambers comprise an annular manifold surrounding the outer ends of said struts, said second strut chambers opening into said manifold, and said manifold being connected to a source of pressurized hot gas.

12. A gas turbine air inlet as in claim 11 wherein the means for maintaining a reduced pressure in said first strut chambers comprise a manifold inwardly of and defined in part by the inner liner means, said first strut chambers opening into said inner manifold, said inner manifold having an outlet duct aerodynamically connected to pressure reducing means.

* * * * *

UNITED STATES PATENT OFFICE
CERTIFICATE OF CORRECTION

PATENT NO. : 3,978,656
DATED : September 7, 1976
INVENTOR(S) : Joseph P. Murphy

It is certified that error appears in the above-identified patent and that said Letters Patent are hereby corrected as shown below:

Col. 2, line 48, after "trap" insert -- leg --
Col. 2, line 49, "edge" should read -- edges --
Col. 4, line 22, "refeence" should read -- reference --
Col. 4, line 24, "rapidly" should read -- radially --
Col. 4, line 35, "25" should read -- 26 --
Col. 5, line 29, after "pocket" insert -- portion --

Col. 6, line 9, "plane" should read -- plate --
Col. 6, line 34, "linenr" should read -- liner --
Col. 6, line 45, "will" should read -- wall --
Col. 9, line 21, after "turbine" insert -- engine --
Col. 9, line 31, "passage" should read -- passages --
Col. 10, line 30, after "outer" change "inner" to read -- liner --.

Signed and Sealed this

First Day of February 1977

[SEAL]

Attest:

RUTH C. MASON
Attesting Officer

C. MARSHALL DANN
Commissioner of Patents and Trademarks